United States Patent
Lin et al.

(10) Patent No.: US 10,802,219 B2
(45) Date of Patent: Oct. 13, 2020

(54) OPTICAL ATTENUATOR

(71) Applicant: SHEN ZHEN WONDERWIN TECHNOLOGY CO., LTD., Shenzhen, Guangdong Province (CN)

(72) Inventors: Jim Lin, Kaohsiung (TW); Kexue Ning, Shenzhen (CN); Xiangxu Zeng, Shenzhen (CN)

(73) Assignee: SHEN ZHEN WONDERWIN TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/519,410

(22) Filed: Jul. 23, 2019

(65) Prior Publication Data

US 2020/0057199 A1 Feb. 20, 2020

(30) Foreign Application Priority Data

Aug. 16, 2018 (TW) .............................. 107128595 A

(51) Int. Cl.
*G02B 6/26* (2006.01)
*G02B 6/38* (2006.01)

(52) U.S. Cl.
CPC ........... *G02B 6/266* (2013.01); *G02B 6/3825* (2013.01); *G02B 6/3885* (2013.01)

(58) Field of Classification Search
None
See application file for complete search history.

(56) References Cited

U.S. PATENT DOCUMENTS 6,669,375 B1 * 12/2003 Bonja .................... G02B 6/266
385/140

FOREIGN PATENT DOCUMENTS

CN 2560956 Y 7/2003

OTHER PUBLICATIONS

Search Report appended to an Office Action, which was issued to Taiwanese counterpart application No. 107128595 by the TIPO dated Jul. 2, 2019.

* cited by examiner

*Primary Examiner* — Michelle R Connelly
(74) *Attorney, Agent, or Firm* — Muncy, Geissler, Olds & Lowe, P.C.

(57) ABSTRACT

An optical attenuator has a male connector, a female connector that is spaced apart from the male connector in a front-rear direction, a holder, and an attenuating member. The holder extends in the front-rear direction and has two opposite ends respectively connected to the male and female connectors. The holder is formed with a mounting groove which extends in the front-rear direction. The attenuating member extends through the mounting groove, and has two opposite ends respectively inserted into the male and female connectors.

6 Claims, 4 Drawing Sheets

OPTICAL ATTENUATOR

CROSS-REFERENCE TO RELATED APPLICATION

This application claims priority of Taiwanese Patent Application No. 107128595, filed on Aug. 16, 2018.

FIELD

The disclosure relates to a fiber optic component, and more particularly to an optical attenuator.

BACKGROUND

Optical attenuators are devices used to reduce power of optical signals in electrically connected optical fibers. The optical attenuators may be designed differently to utilize different principles of operation, and may be designed structurally differently to be compatible with different types of fiber optic connectors.

Referring to FIG. 1, a conventional optical attenuator 1 compatible with a multi-fiber push on (MPO) connector includes a male connector 11 that is formed with two plug pins 110, a female connector 12 that is spaced apart from the male connector 11 in a front-rear direction (A), and an attenuating member 13 that extends in the front-rear direction (A) and that has two opposite ends respectively inserted into the male and female connectors 11, 12. The attenuating member 13 is made of a plurality of evenly arranged attenuating wires 131. When the male and female connectors 11, 12 are respectively and electrically connected to other MPO connectors (not shown), the optical attenuator 1 reduces power of optical signals passing through the attenuating member 13.

However, as the attenuating member 13 is usually exposed to external environment, a force exerted by a user when plugging or unplugging the male and female connectors 11, 12 may unintentionally pull or push the attenuating member 13, thereby damaging the wires 131 during the operations.

SUMMARY

Therefore, an object of the disclosure is to provide an optical attenuator that can alleviate the drawback of the prior art.

According to the disclosure, the optical attenuator has a male connector, a female connector that is spaced apart from the male connector in a front-rear direction, a holder, and an attenuating member. The holder extends in the front-rear direction and has two opposite ends respectively connected to the male and female connectors. The holder is formed with a mounting groove which extends in the front-rear direction. The attenuating member extends through the mounting groove, and has two opposite ends respectively inserted into the male and female connectors.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
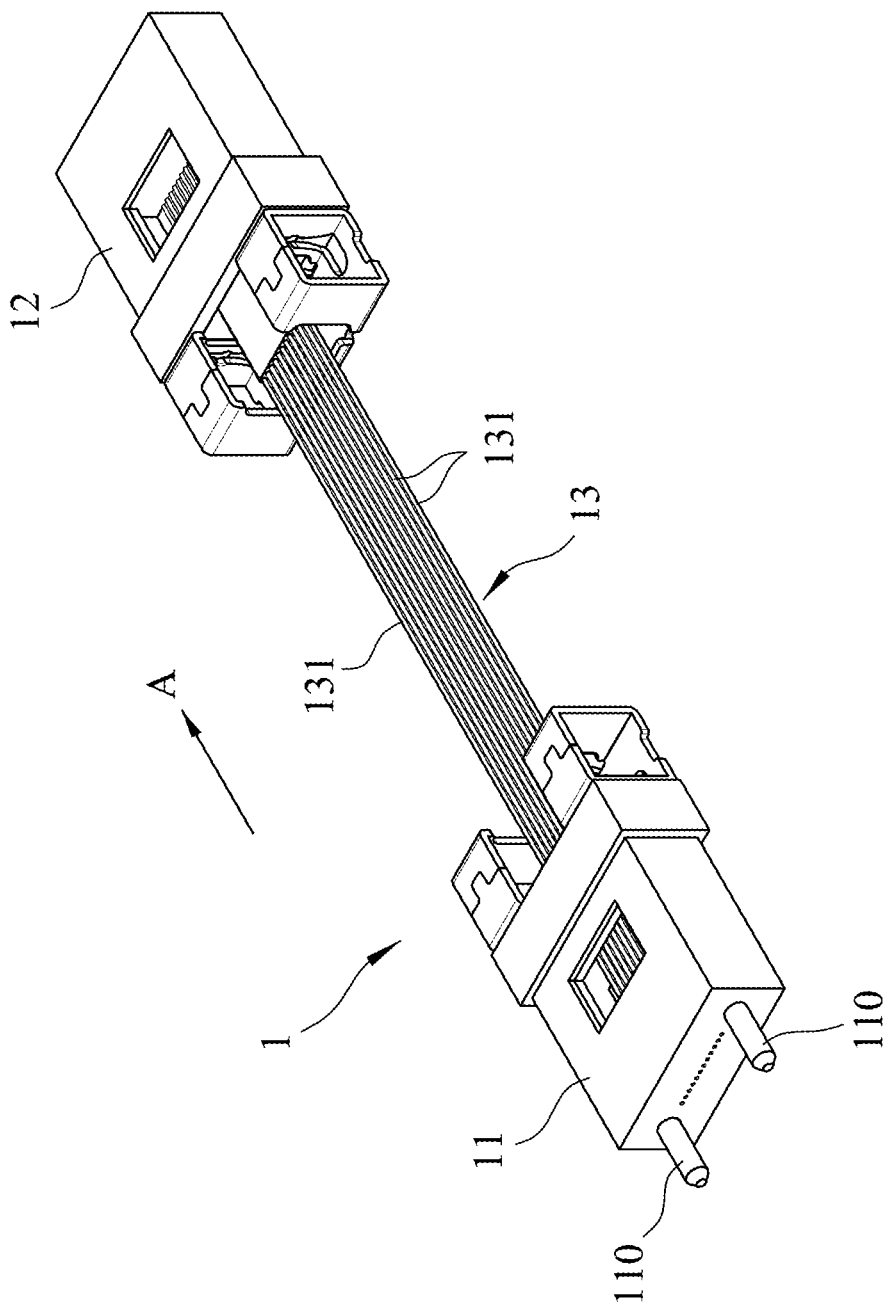
FIG. 1 is a perspective view of a conventional optical attenuator.
Figure 2:
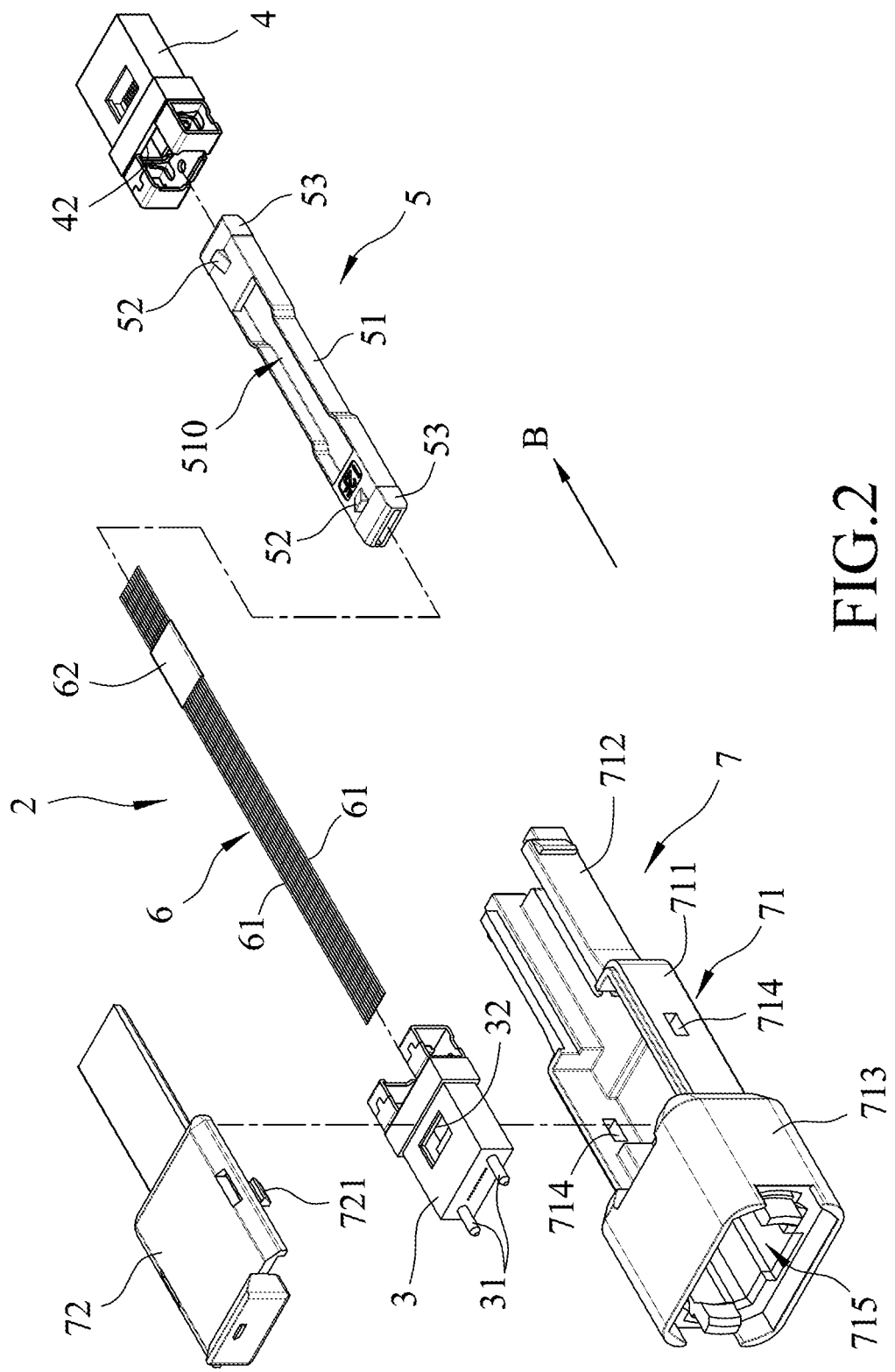
FIG. 2 is an exploded perspective view of an embodiment of an optical attenuator according to the disclosure.
Figure 3:
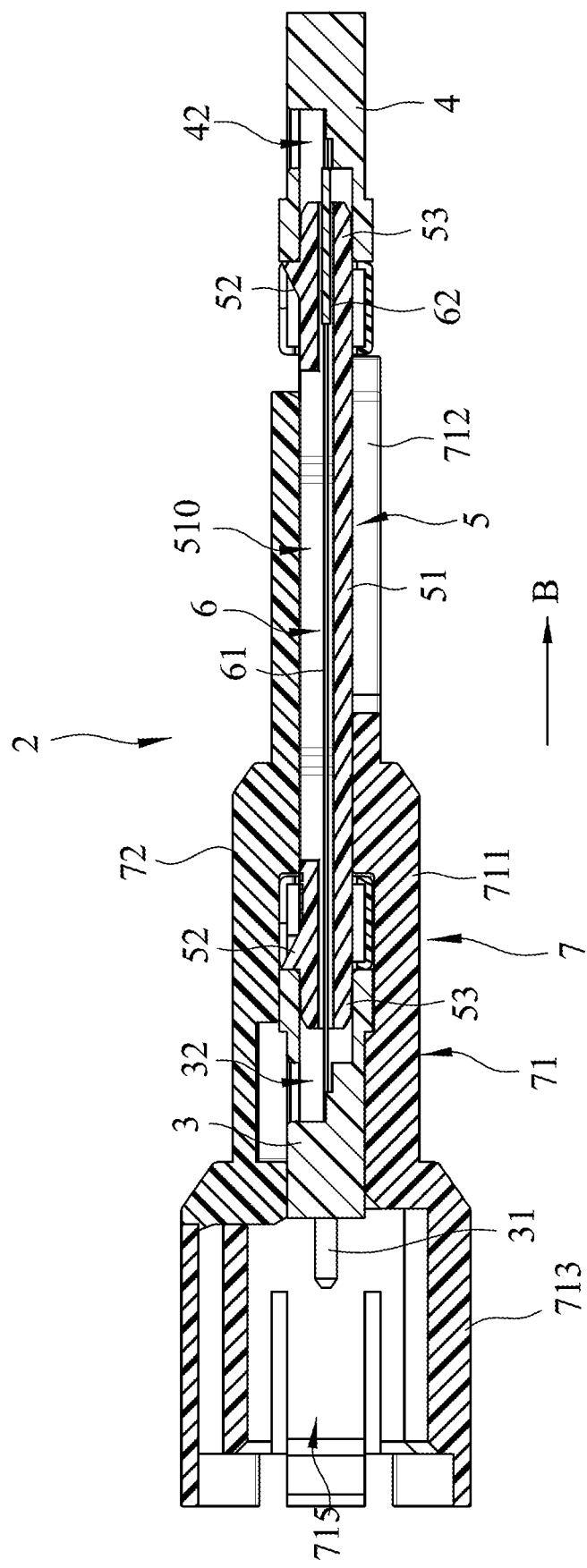
FIG. 3 is a side sectional view of the embodiment.
Figure 4:
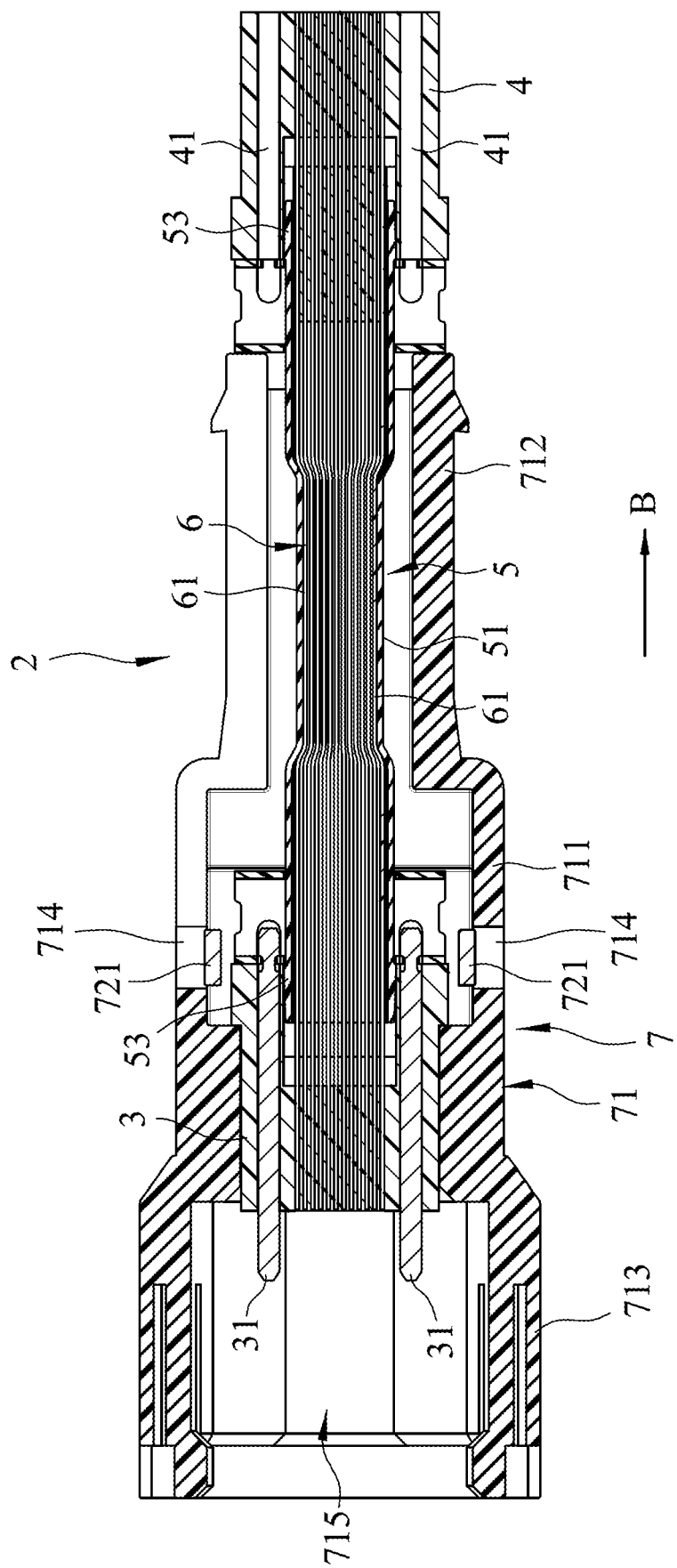
FIG. 4 is a top sectional view of the embodiment.

Referring to FIGS. 2 to 4, an embodiment of an optical attenuator 2 according to the disclosure includes a male connector 3, a female connector 4 that is spaced apart from the male connector 3 in a front-rear direction (B), a holder 5 that extends in the front-rear direction (B) and that has two opposite ends respectively connected to the male and female connectors 3, 4, an attenuating member 6 that is mounted in the holder 5 and that has two opposite ends respectively inserted into the male and female connectors 3, 4, and a housing 7 that is sleeved to the male connector 3 and the holder 5. Both the male and female connectors 3, 4 are MPO connectors, with the male connector 3 being formed with a plurality of plug pins 31 and defining a male wiring space 32, and the female connector 4 having a pin socket 41 compatible with the plug pins 31 and defining a female wiring space 42 that spatially communicates with the pin socket 41.

The holder 5 includes a main body portion 51, two protruding portions 52, and two insertion portions 53. The main body portion 51 has a U-shaped cross-section when viewed in the front-rear direction (B), and defines a mounting groove 510 that extends in the front-rear direction (B) and that spatially communicates with the male and female wiring spaces 32, 42. The protruding portions 52 protrude outwardly from the main body portion 51, are spaced apart in the front-rear direction (B), and respectively abut against the male and female connectors 3, 4. The insertion portions 53 respectively extend from two opposite ends of the main body portion 51 toward and into the male and female connectors 3, 4, such that the main body portion 51 spatially communicates with the male and female wiring spaces 32, 42. The protruding portions 52, by respectively abutting against the male and female connectors 3, 4, ensure that the main body portion 51 is fixedly positioned between the male and female connectors 3, 4, and that the male and female connectors 3, 4 would not be moved toward each other. Likewise, the insertion portions 53, which are respectively connected to the male and female connectors 3, 4, serve to position the main body portion 51, the male connector 3 and the female connector 4 relative to one another so as to maintain the distance between the male and female connectors 3, 4. The attenuating member 6 is mounted to the mounting groove 510 of the holder 5, and is made of a plurality of attenuating wires 61 and a positioning member 62 that sleeves the attenuating wirings 61 by an injection molding technique for arranging the attenuating wires 61 in an orderly fashion. Each of the attenuating wires 61 has two ends respectively extending through the insertion portions 53 and into male and female wiring spaces 32, 42.

The housing 7 includes a housing body 71 and a housing cover 72 that is removably mounted to the housing body 71. The housing body 71 has a mounting portion 711 for the male connector 3 to be mounted therein, an extended portion 712 that extends from the mounting portion 711 in the front-rear direction (B) toward and abuts against the female connector 4 and that is for the holder 5 to be mounted therein, and a socket portion 713 that extends from the mounting portion 711 in the front-rear direction (B) away from the female connector 4. The mounting portion 711 cooperates with the housing cover 72 to cover the male connector 3, and is formed with a plurality of coupling holes 714. The extended portion 712 cooperates with the housing cover 72 to partly cover the holder 5 and the attenuating member 6. The socket portion 713 defines an insertion space 715 for the plug pins 31 of the male connector 3 to be inserted thereinto. The insertion space 715 further enables a female connector (not shown) to be inserted thereinto and to be coupled to the male connector 3. The housing cover 72 has a plurality of coupling tongues 721 that are operable to be removably coupled to the respective coupling holes 714.

Overall, by maintaining a fixed distance between the male and female connector 3, 4 via the protruding portions 52 and the insertion portions 53 of the holder 5, the attenuating wires 61 of the attenuating member 6 would not be directly damaged when the optical attenuator 2 is being plugged or unplugged by an external force, as the attenuating member 6 would not experience any tension or contraction when two ends thereof, which are respectively inserted into the male and female connectors 3, 4, remain in the same distance. In addition, the housing 7 protects the attenuating member 6 from outside exposure, extending its service life.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical attenuator comprising:
   a male connector;
   a female connector that is spaced apart from said male connector in a front-rear direction;
   a holder that extends in the front-rear direction and that has two opposite ends respectively connected to said male and female connectors, said holder being formed with a mounting groove which extends in the front-rear direction; and
   an attenuating member that extends through said mounting groove and that has two opposite ends respectively inserted into said male and female connectors;
   wherein said male connector defines a male wiring space for one end of said attenuating member to extend thereinto, and said female connector defines a female wiring space for the other end of said attenuating member to extend thereinto; and
   wherein said holder includes:
     a main body portion that defines said mounting grooves and that spatially communicates with said male and females wiring spaces,
     two protruding portions that protrude outwardly from said main body portion, that are spaced apart in the front-rear direction, and that respectively abut against said male and female connectors, and
     two insertion portions that respectively extend from two opposite ends of said main body portion toward and into said male and female connectors.

2. The optical attenuator as claimed in claim 1, further comprising a housing that is sleeved to said male connector and said holder.

3. The optical attenuator as claimed in claim 2, wherein said housing includes a housing body that at least partially houses said male connector and said holder, and a housing cover that is removably mounted to said housing body.

4. An optical attenuator comprising:
   a male connector;
   a female connector that is spaced apart from said male connector in a front-rear direction,
   a holder that extends in the front-rear direction and that has two opposite ends respectively connected to said male and female connectors, said holder being formed with a mounting groove which extends in the front-rear direction;
   an attenuating member that extends through said mounting groove and that has two opposite ends respectively inserted into said male and female connectors, and
   a housing that is sleeved to said male connector and said holder;
   wherein, said housing includes a housing body that at least partially houses said male connector and said holder, and a housing cover that is removably mounted to said housing body; and
   wherein said housing body has:
   a mounting portion for said male connector to be mounted therein,
   an extended portion that extends from said mounting portion in the front-rear direction toward and abuts against said female connector, and
   a socket portion that extends from said mounting portion in the front-rear direction away from said female connector, said socket portion defining an insertion space for said male connector to be inserted thereinto.

5. The optical attenuator as claimed in claim 4, wherein said mounting portion of said housing body is formed with a plurality of coupling holes; and
said housing cover has a plurality of coupling tongues that are operable to be removably coupled to said respective coupling holes.

6. The optical attenuator as claimed in claim 5, wherein said male connector defines a male wiring space for one end of said attenuating member to extend thereinto, and said female connector defines a female wiring space for the other end of said attenuating member to extend thereinto; and
said holder includes:
   a main body portion that defines said mounting grooves and that spatially communicates with said male and female wiring spaces,
   two protruding portions that protrude outwardly from said main body portion, that are spaced apart in the front-rear direction and that respectively abut against said male and female connectors, and two insertion portions that respectively extend from two opposite ends of said main body portion toward and into said male and female connectors.

\* \* \* \* \*